United States Patent
Okuno

(10) Patent No.: US 12,531,107 B2
(45) Date of Patent: Jan. 20, 2026

(54) CONTROL CIRCUIT AND SEMICONDUCTOR MEMORY DEVICE

(71) Applicant: Winbond Electronics Corp., Taichung (TW)

(72) Inventor: Shinya Okuno, Yokohama (JP)

(73) Assignee: WINBOND ELECTRONICS CORP., Taichung (TW)

( * ) Notice: Subject to any disclaimer, the term of this patent is extended or adjusted under 35 U.S.C. 154(b) by 188 days.

(21) Appl. No.: 18/510,829

(22) Filed: Nov. 16, 2023

(65) Prior Publication Data

US 2024/0242753 A1    Jul. 18, 2024

(30) Foreign Application Priority Data

Jan. 13, 2023 (JP) ................. 2023-003465

(51) Int. Cl.
| | | |
|---|---|---|
| G11C 11/4076 | (2006.01) | |
| G11C 11/4093 | (2006.01) | |
| H03L 7/183 | (2006.01) | |

(52) U.S. Cl.
CPC ...... *G11C 11/4076* (2013.01); *G11C 11/4093* (2013.01); *H03L 7/183* (2013.01)

(58) Field of Classification Search
CPC ................................. G11C 11/4076
See application file for complete search history.

(56) References Cited

U.S. PATENT DOCUMENTS

| | | | | |
|---|---|---|---|---|
| 8,310,292 B1 * | 11/2012 | Phan | ............... | H03L 7/113 327/158 |
| 2012/0194241 A1 | 8/2012 | Shin | | |
| 2014/0313847 A1 * | 10/2014 | Jeong | ............... | G11C 7/222 365/233.12 |
| 2016/0182063 A1 * | 6/2016 | Seo | ............... | H03L 7/16 327/149 |

(Continued)

FOREIGN PATENT DOCUMENTS

| | | |
|---|---|---|
| CN | 110827875 A | 2/2020 |
| JP | 3-1760 A | 1/1991 |

(Continued)

OTHER PUBLICATIONS

Japanese Office Action for Japanese Application No. 2023-003465, dated Sep. 3, 2024, with English translation.

(Continued)

*Primary Examiner* — Hoai V Ho
(74) *Attorney, Agent, or Firm* — Birch, Stewart, Kolasch & Birch, LLP

(57) ABSTRACT

A control circuit is provided herein, which can suppress the prolongation of a delay operation, so that the sequence using the DLL circuit to adjust the delay of the internal clock signal can be finished within a predetermined execution period. A control circuit includes a delay control unit delaying an input clock signal to generate an output clock signal based on the phase difference between the input clock signal and an output clock signal. The control circuit further includes a clock control unit. When the phase difference is (Continued)

greater than the first predetermined amount, the clock control unit inputs a clock signal delayed from the input clock signal by a second predetermined amount to the delay control unit as the input clock signal.

19 Claims, 9 Drawing Sheets

(56) References Cited

U.S. PATENT DOCUMENTS

2017/0338825 A1* 11/2017 Lee .......................... H03L 7/10
2022/0006461 A1    1/2022 Choi et al.

FOREIGN PATENT DOCUMENTS

| | | |
|---|---|---|
| JP | 5-241678 A | 9/1993 |
| JP | 2002-15078 A | 5/2002 |
| JP | 2005-251368 A | 9/2005 |
| KR | 10-2006-0038138 A | 5/2006 |
| TW | 201303879 A1 | 1/2013 |
| TW | 201503597 A | 1/2015 |
| TW | 202001888 A | 1/2020 |
| WO | WO 2004/097608 A1 | 11/2004 |

OTHER PUBLICATIONS

Japanese Office Action for Japanese Application No. 2023-003465, dated Mar. 11, 2025, with English translation.
Korean Office Action for Korean Application No. 10-2023-0027338, dated Dec. 9, 2024, with English translation.

* cited by examiner (1)

(2)

CONTROL CIRCUIT AND SEMICONDUCTOR MEMORY DEVICE

CROSS REFERENCE TO RELATED APPLICATIONS

This application claims priority of Japanese Patent Application No. 2023-003465, filed on Jan. 13, 2023, the entirety of which is incorporated by reference herein.

BACKGROUND OF THE INVENTION

Field of the Invention

The disclosure relates to a control circuit and a semiconductor memory device.

Description of the Related Art

A DRAM (Dynamic Random Access Memory) has a DLL circuit (Delay Locked Loop) circuit as a phase synchronization circuit. DRAM uses a DLL circuit to generate an internal clock signal for outputting data signals that is synchronized with an externally input clock signal, such as patent document: US 20120194241 A1.

When a DLL circuit is used to adjust the delay of an internal clock signal, the detection operation sequence (including the N-value) will be executed. The N-value represents the reset operation of the DLL circuit, the delay operation of the DLL circuit (activating each delay line and simultaneously synchronizing the external clock with the internal clock), and the number of delay clock cycles between the input clock signal and the internal clock signal. The locking time Tdll herein caused by the delay operation of the DLL circuit can be expressed by the following formula.

$$Tint + Tdll = N \times tCK$$

In the above formula, Tint represents the existing delay time in the DLL circuit, and tCK represents the clock cycle. For example, when the temperature in the semiconductor memory device causes the clock period (tCK) to be longer than the existing delay time (Tint), as shown in the above formula, the locking time (Tdll) caused by the delay operation of the DLL circuit will also elongate. When the locking time is prolonged, the whole execution time of the above-mentioned sequence becomes longer, and the execution of the next sequence may be delayed. In particular, when the delay is extended, it may exceed the execution period (tDLLK) of the sequence set in advance. In addition, in order to cope with the increase in speed of semiconductor integrated circuits, it is desirable to increase the speed of the delay operation in the sequence as much as possible, but its structure is quite complicated, so it is desirable to have a simpler structure.

BRIEF SUMMARY OF THE INVENTION

The control circuit of the present invention includes a delay control unit. The delay control unit delays an input clock signal to generate an output signal based on the phase difference between the input clock signal and the output clock signal. The control circuit further includes a clock control unit. When the phase difference is greater than a first predetermined amount, the clock control unit delays the input clock signal by a second predetermined amount to be a clock signal, and then inputs the clock signal to the delay control unit as the input clock signal.

According to the control circuit, the semiconductor memory device, and the control method of the semiconductor memory device provided in the present invention, it is possible to have a simple configuration and possible to suppress the extension of the delay operation.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2 (2) is a schematic diagram of a configuration of a phase detection unit.

FIG. 4 (2) is a schematic diagram of the relationship between the input clock signal and the delay time in the control circuit in accordance with a conventional example.

FIG. 5 (2) is the timing diagram of the relationship between the input clock signal and the delay time when the phase difference is less than 180 degrees.

DETAILED DESCRIPTION OF THE INVENTION

Figure 1:
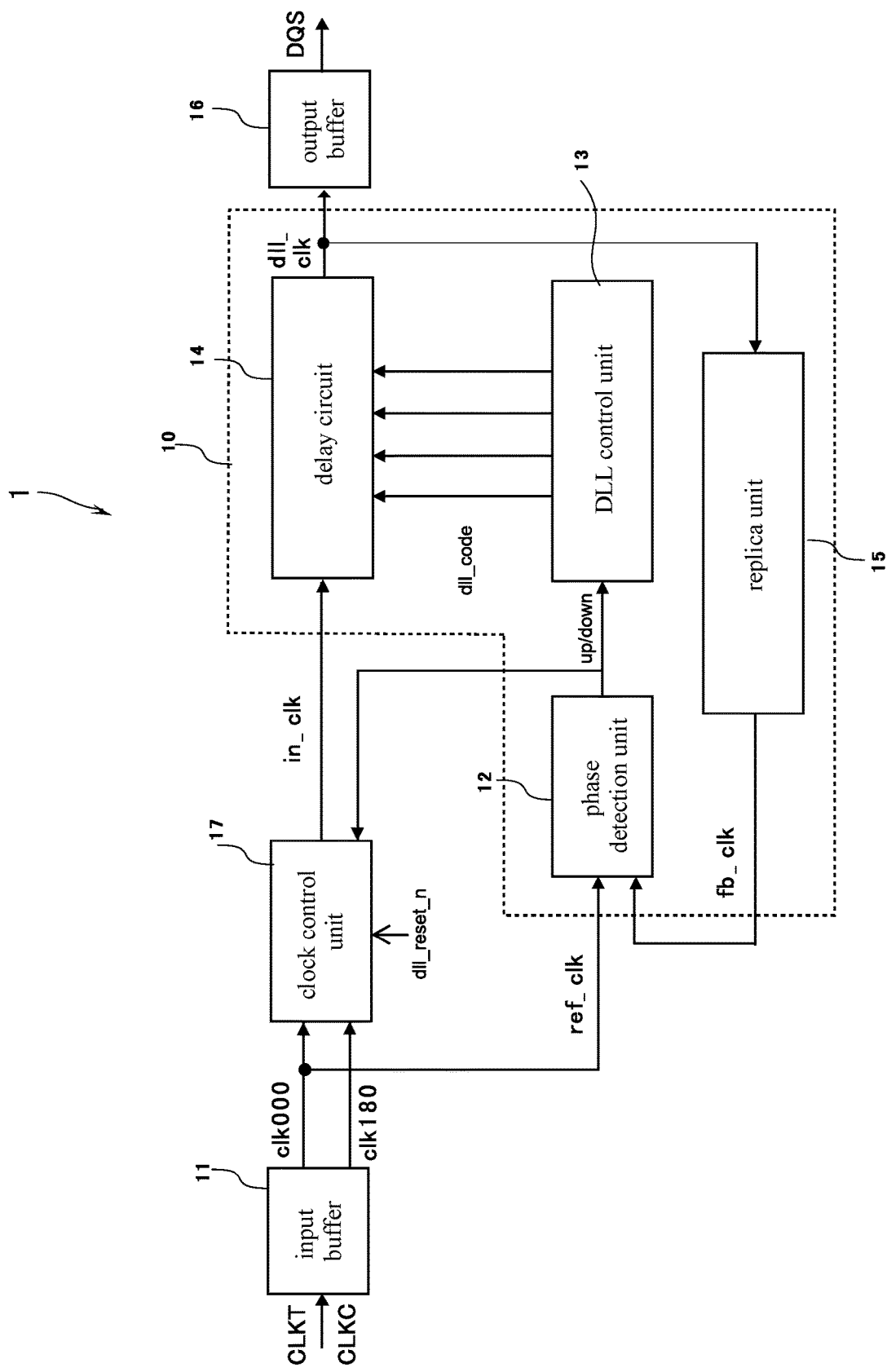
FIG. 1 is a schematic block diagram of a control circuit in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

FIG. 1 illustrates a DLL circuit 1 (control circuit) in accordance with an embodiment of the present invention. In this embodiment, the control circuit is provided in a semiconductor memory device such as a DRAM. For brevity, the conventional structures (for example, N-value detection unit, latency control unit, instruction decoder, memory cell array, interface unit for input and output, etc.) of the semiconductor memory devices (such as DRAM) are not shown.

The DLL circuit 1 includes: an input buffer 11, a phase detection unit 12, a DLL control unit 13, a delay circuit 14, a replica unit 15, an output buffer 16, and a clock control unit 17. The phase detection unit 12, the DLL control unit 13, the delay circuit 14, and the replica unit 15 constitute the delay control unit 10. When the sequence starts, the DLL circuit 1 first performs a reset operation to reset the delay circuit 14 of the DLL circuit 1 to an initial state, and then performs a delay operation, whereby the delay circuit 14 delays the input clock signal and generates a desired output clock signal. That is, in this embodiment, the reset operation and the delay operation performed in this order are included in the sequence.

Figure 2:
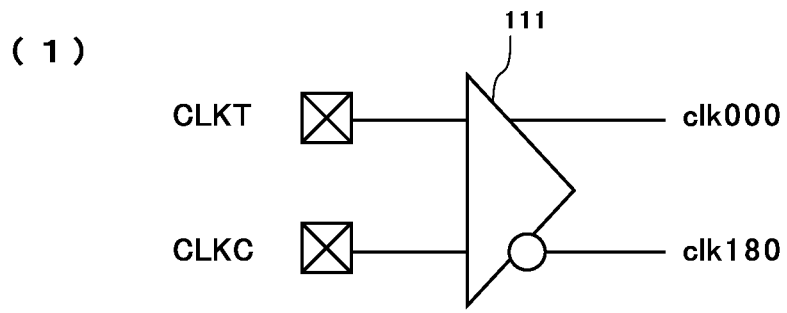
FIG. 2 (1) is a schematic diagram of a configuration of an input buffer.
Figure 2:
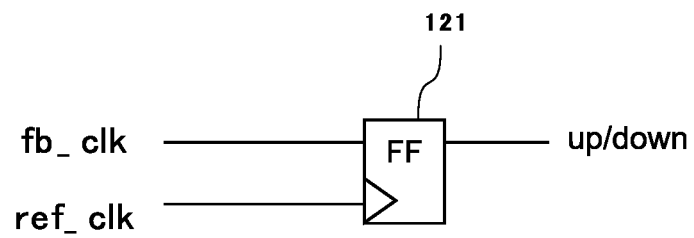

The input buffer 11 buffers the clock signal CLKT and the clock signal CLKC input to the input buffer 11, and generates the first clock signal clk000 having the same phase as the clock signal CLKT and the second clock signal clk180 having the same phase as the clock signal CLKC. Specifically, as shown in FIG. 2 (1), the input buffer 11 includes an amplifier 111. Two complementary clock signals CLKT and CLKC as external clock signals are input to the amplifier 111. The input clock signal CLKT and the clock signal CLKC are amplified by the amplifier 111 to generate the first clock signal clk000 and the second clock signal clk180. The second clock signal clk180 is a clock signal generated by inverting the first clock signal clk000.

Referring to FIG. 1, the generated first clock signal clk000 and second clock signal clk180 are input to the clock control unit 17, and the first clock signal clk000 is also input to the phase detection unit 12 as a reference clock signal ref_clk.

The phase signal up/down and the reset signal dll_reset_n output from the phase detection unit 12 are input to the clock control unit 17. When the reset signal dll_reset_n is at a high level, it indicates that the reset operation has ended. The clock control unit 17 outputs either the first clock signal clk000 or the second clock signal clk180 as an input clock signal in_clk based on the phase signal up/down, and the input clock signal in_clk is input to the delay circuit 14.

The delay circuit 14 generates a delay signal (output clock signal) dll_clk based on the delay amount set by the DLL control unit 13, and transmits the delay signal dll_clk to the output buffer 16 and the replica unit 15. The delay signal dll_clk is obtained by delaying from the input clock signal in_clk input by the pulse control unit 17. The delay signal dll_clk input to the output buffer 16 is buffered in the output buffer 16 and output as the output signal DQS. The replica unit 15 outputs the delay signal dll_clk generated by the delay circuit 14 as the feedback signal fb_clk. The feedback signal fb_clk is input to the phase detection unit 12.

The reference clock signal ref_clk and the feedback signal fb_clk are input to the phase detection unit 12. The phase detection unit 12 generates a phase signal up/down and inputs the phase signal up/down to the DLL control unit 13. The phase signal up/down indicates whether the phase of the feedback signal fb_clk is leading (with a delay less than 180 degrees) or behind (with a delay more than 180 degrees) relative to the clock signal ref_clk.

Specifically, the phase detection unit 12 is composed of a D flip-flop circuit 121 as shown in FIG. 2 (2). The feedback signal fb_clk is input to the D flip-flop circuit 121 as an input signal, the reference clock signal ref_clk is input to the D flip-flop circuit 121 as a clock signal, and the D flip-flop circuit 121 outputs a phase signal up/down as an output signal. When the delay of the feedback signal fb_clk to the reference clock signal ref_clk is less than 180 degrees, the generated phase signal up/down is at the high level (up); when the delay of the feedback signal fb_clk to the reference clock signal ref_clk is greater than 180 degrees, the generated phase signal up/down is at the low level (down).

Returning to FIG. 1, the DLL control unit 13 determines the amount of delay from the phase difference detected by the phase detection unit 12. Specifically, the DLL control unit 13 generates and outputs a control signal dll_code composed of a plurality of bits as the delay amount in the delay operation according to the phase signal up/down from the phase detection unit 12. The output control signal dll_code is then input to the delay circuit 14.

The delay circuit 14 is a variable delay unit that performs a delay operation. Specifically, the delay circuit 14 activates the delay line according to the control signal dll_code, so as to delay the input signal in_clk to generate the delay signal dll_clk.

In addition, when the DLL control unit 13 determines that the input signal in_clk and the feedback signal fb_clk corresponding to the delay signal dll_clk converge to a predetermined range based on the phase signal up/down, the DLL control unit 13 determines that the delay operation has ended. Thereby, the delay operation ends.

In this embodiment of the DLL circuit 1, the delay control unit 10 generates a delay signal dll_clk by delaying the input clock signal in_clk based on the input clock signal in_clk and the feedback signal fb_clk copied from the delay signal dll_clk. The clock control unit 17 is described in the following paragraphs. The clock control unit 17 controls the input clock signal in_clk input to the delay control unit 10.

The phase signal up/down, the reset signal dll_reset_n, the first clock signal clk000, and the second clock signal clk180 are input to the clock control unit 17. The clock control unit 17 selects either the first clock signal clk000 or the second clock signal clk180 as the input clock signal in_clk, and inputs the input clock signal in_clk to the delay circuit 14. Before the delay operation, the clock control unit 17 selects the first clock signal clk000 as the input clock signal in_clk. After the delay operation starts, the clock control unit 17 selects either the first clock signal clk000 or the second clock signal clk180 as the input clock signal in_clk according to the phase signal up/down.

Figure 3:
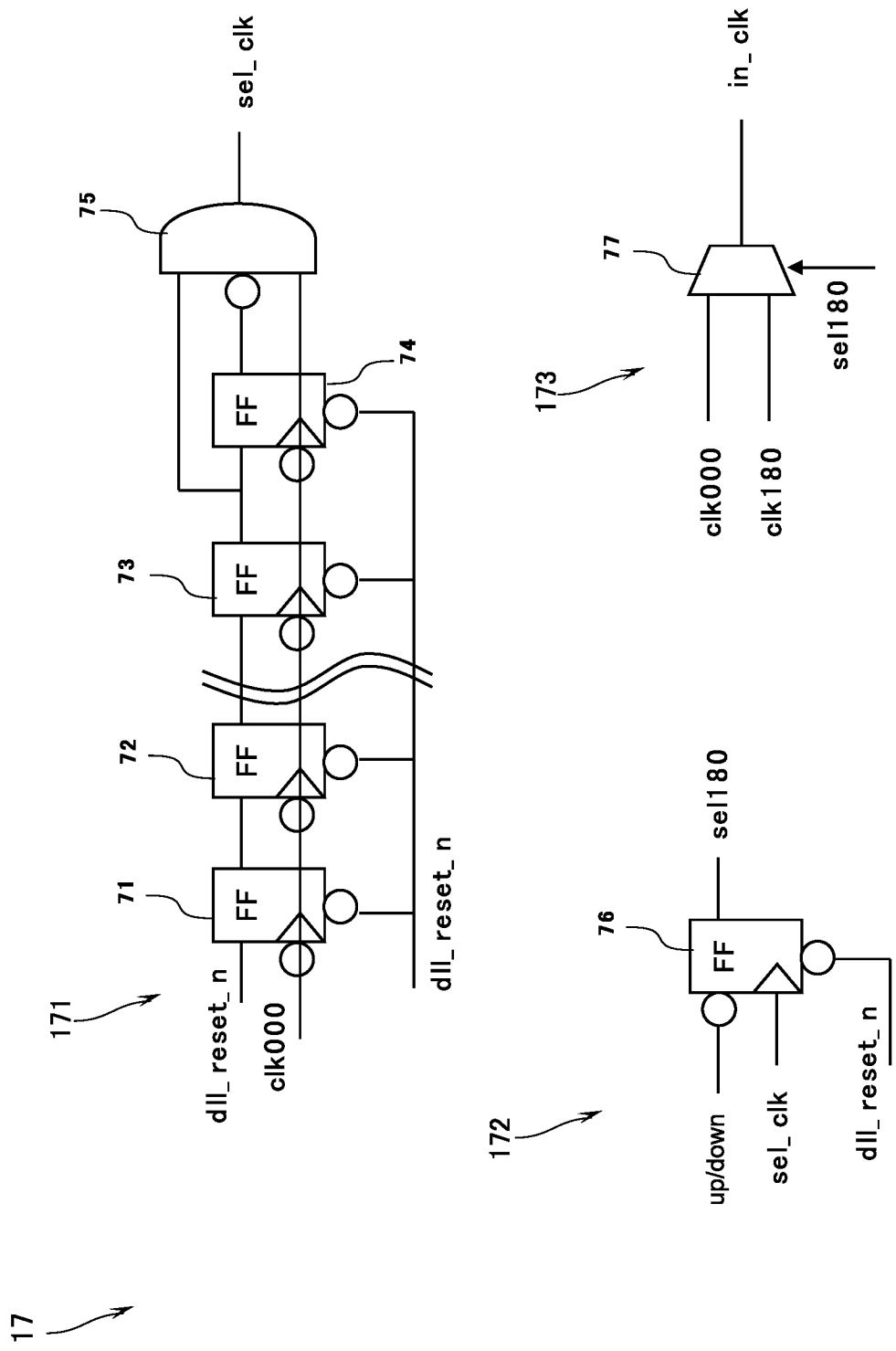
FIG. 3 is a schematic diagram of a configuration of a clock control unit.

The detailed configuration of the clock control unit 17 is illustrated in FIG. 3. The clock control unit 17 includes a timing signal generation unit 171, a selection signal generation unit 172, and an internal clock selection unit 173.

After the delay operation starts with passing a predetermined period, the timing signal generation unit 171 generates a timing signal sel_clk indicating the timing of the passing predetermined period, and the timing signal sel_clk is input to the selection signal generation unit 172. This predetermined period is selected when the clock is selected during the DLL circuit 1 is stabilized after the reset operation.

When the timing signal sel_clk indicates that the timing of the predetermined period has passed, the selection signal generation unit 172 determines whether the phase difference between the input clock signal (reference clock signal ref_clk) and the output clock signal (feedback signal fb_clk) of the delay control unit 10 is greater than 180 degrees, and generates a selection signal sel180 indicating the determination result, which is input to the internal clock selection unit 173. Here, the phase signal up/down is used to determine whether the phase difference between the input clock signal and the output clock signal of the delay control unit 10 is greater than 180 degrees. As mentioned above, when the delay of the feedback signal fb_clk (in phase with the output clock signal of the delay control unit 10) to the reference clock signal ref_clk (in phase with the input clock signal of the delay control unit 10) is less than 180 degrees, the phase signal up/down is at the high level (up); and when the delay is greater than 180 degrees, the phase signal up/down is at the low level (down). Therefore, the phase signal up/down can be used for simple determination. In other words, when the timing signal sel_clk indicates that the timing of the predetermined period has passed, the selection signal generation unit 172 determines whether the phase signal up/down is greater than 180 degrees, and generates a selection signal sel180 indicating the determination result, which is input to the internal clock selection unit 173. The internal clock selection unit 173 selects either the first clock signal clk000 or the second clock signal clk180 as the input clock signal in_clk based on the determination result indicated by the selection signal sel180, and outputs the input clock signal in_clk.

Figure 4:
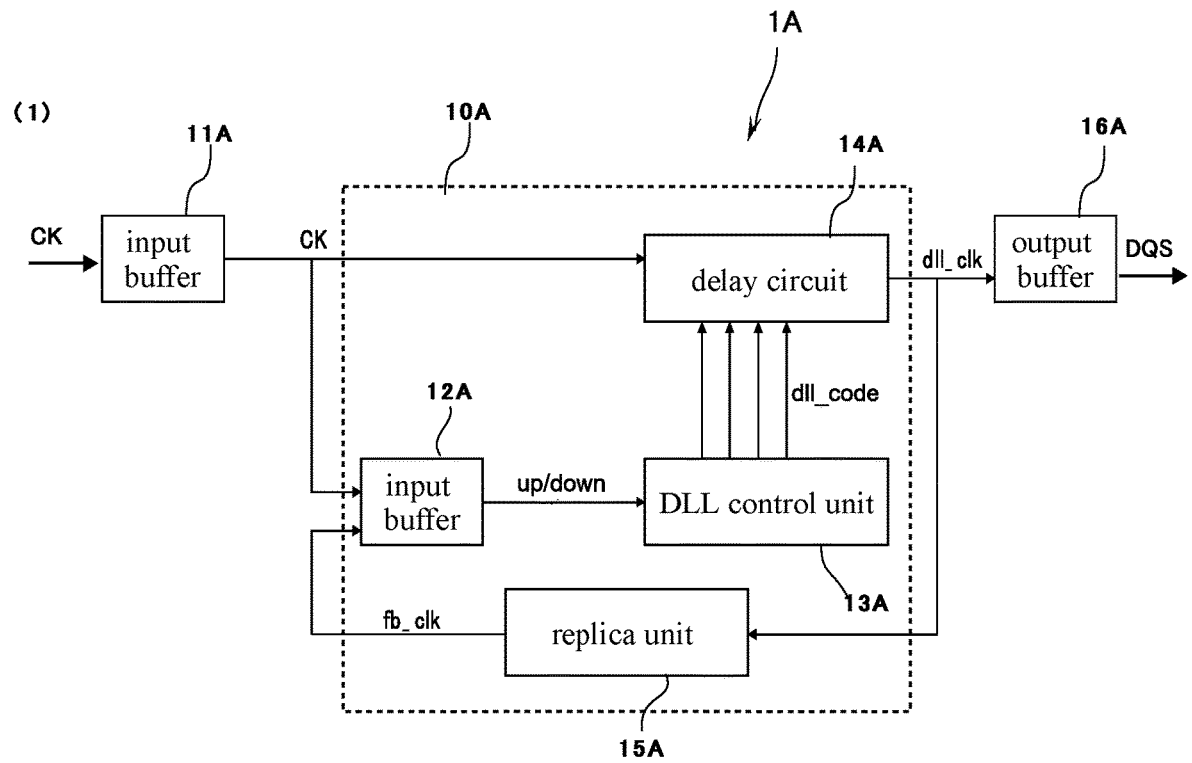
FIG. 4 (1) is a schematic diagram of a configuration of a control circuit in accordance with a conventional embodiment.
Figure 4:
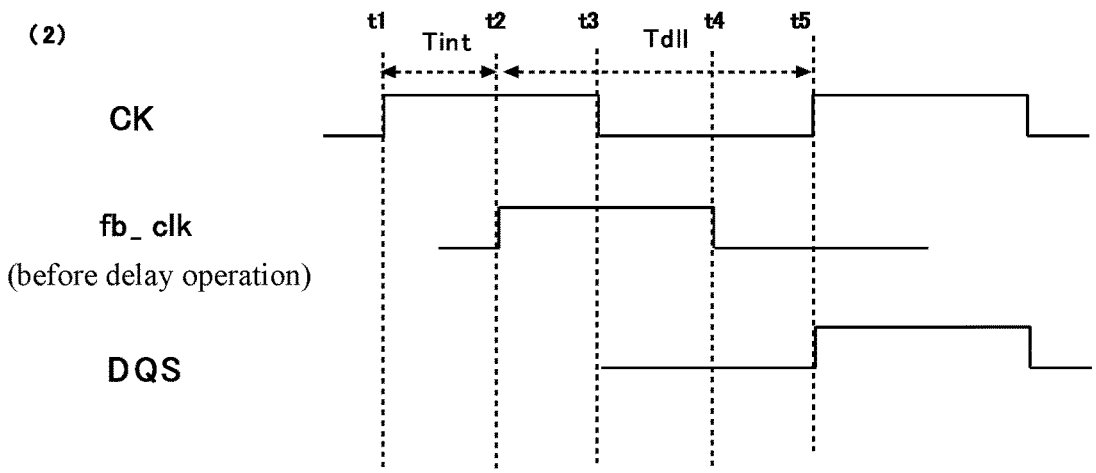
Figure 5:
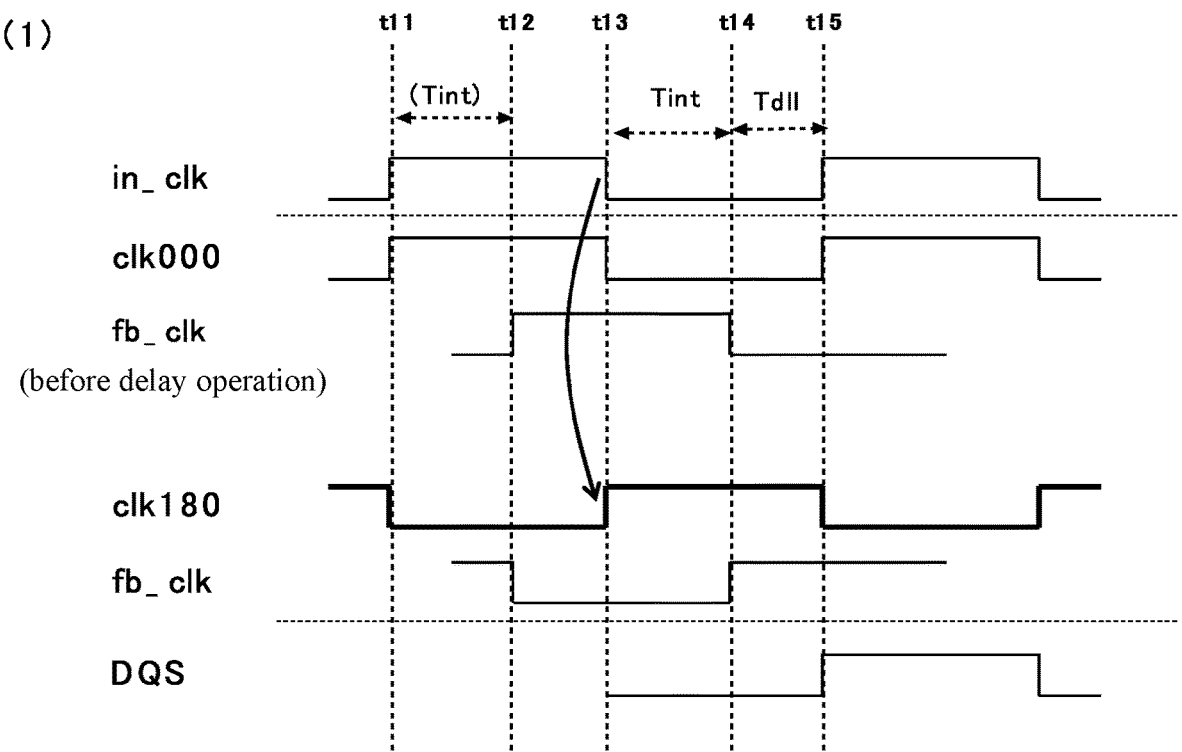
FIG. 5 (1) is a timing diagram of the relationship between the input clock signal and the delay time when the phase difference is greater than 180 degrees.
Figure 5:
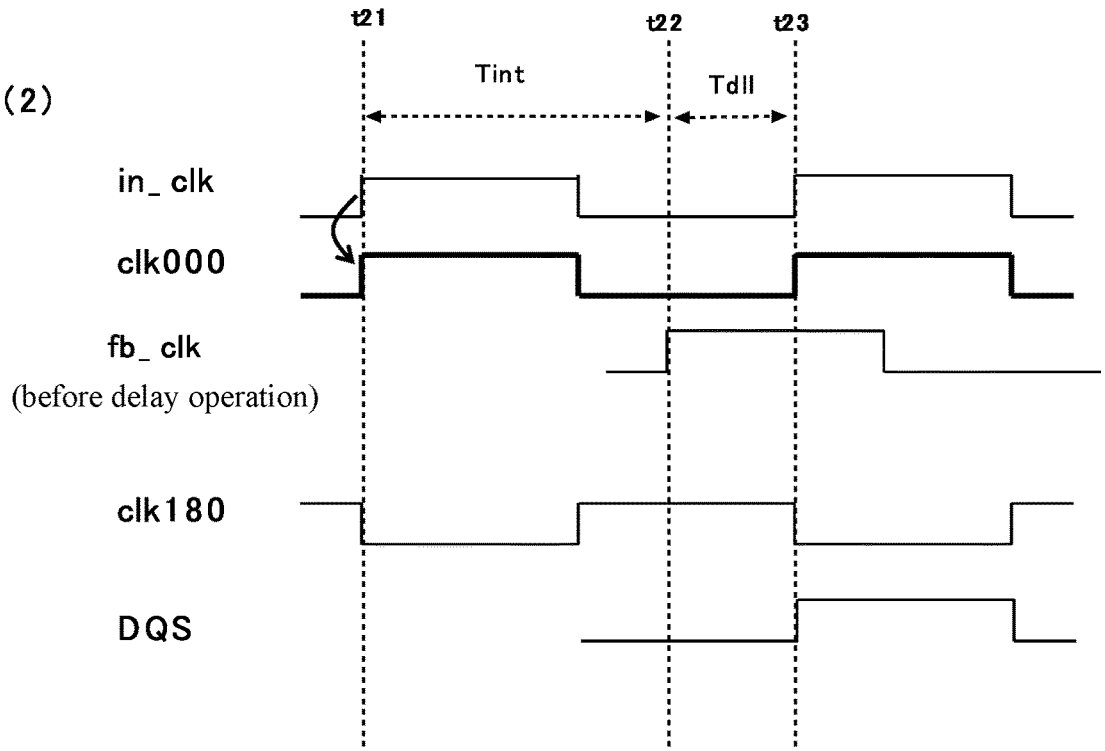
Figure 6:
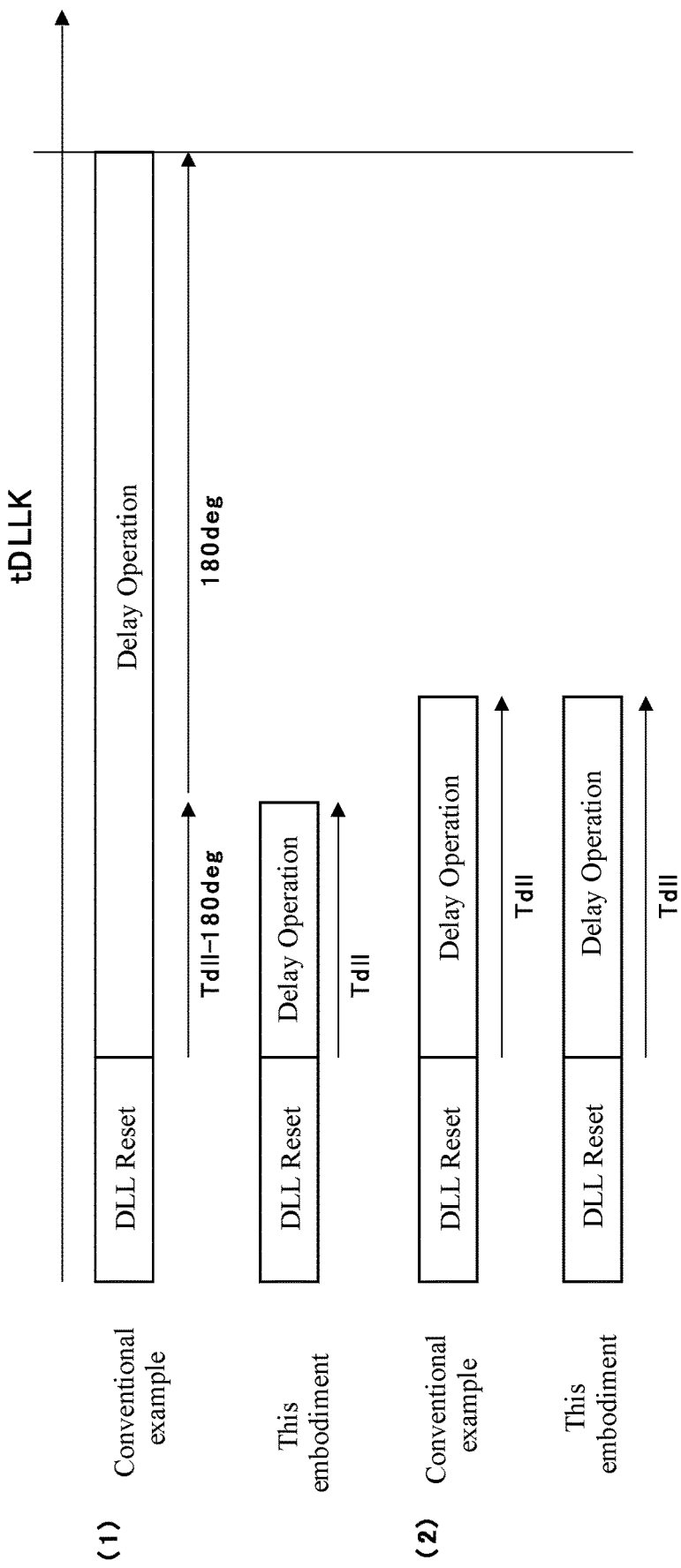
FIGS. 6 (1), (2) are schematic diagrams illustrating each state of the proposed sequence and the conventional sequence.

The clock control unit 17 is further illustrated in FIGS. 4, 5 and 6.

In the conventional example shown in FIG. 4 (1), the DLL circuit 1A differs from the present embodiment in that the DLL circuit 1A does not include a clock control unit 17. In the DLL circuit 1A, the clock signal CK output from the input buffer 11A is input to the delay control unit 10A (phase detection unit 12A, DLL control unit 13A and delay circuit 14A), and outputs a delay signal dll_clk. In the conventional example of such a configuration, as shown in FIG. 4 (2), the clock signal CK changes from a low level to a high level at time t1; in contrast, the feedback signal fb_clk passes through the existing delay time Tint, and changes from a low level to a high level at time t2. Since the period of time t1 to time t2 is less than a half period of the clock signal CK, the feedback signal fb_clk is delayed by more than 180 degrees relative to the period of the clock signal CK. Then, after the delay circuit 14A performs the delay operation on the clock signal CK, the rising edge of the clock signal CK coincides with the rising edge of the output signal DQS at time t5, so that the clock signal CK and the feedback signal fb_clk (that is, the output signal DQS) are synchronous. In a conventional embodiment, when the delay between the feedback signal fb_clk and the clock signal CK is greater than a half cycle of the clock cycle before the delay operation, that is, when the phase difference is greater than 180 degrees, the delay amount due to the delay operation that must be eliminated (e.g., the locking time Tdll) becomes to be the period from time t2 to time t5, the delay operation may be prolonged since the locking time Tdll, which is the delay amount, is the period from time t2 to time t5.

In contrast, this embodiment includes a clock control unit 17, which inputs either the first clock signal clk000 or the second clock signal clk180 as the input clock signal in_clk to the delay circuit 14 (delay control unit 10) according to the phase signal up/down, thereby suppressing the extension of the delay operation. Firstly, since the input clock signal in_clk input to the delay control unit 10 before the delay operation is the first clock signal clk000, the input clock signal in_clk is in the same phase as the first clock signal clk000. When the phase difference between the delayed signal dll_clk output from the delay control unit 10 and the in-phase feedback signal fb_clk is greater than 180 degrees, the clock control unit 17 takes the second clock signal clk180 as the input clock signal in_clk and outputs the input clock signal in_clk to the delay circuit 14. In this way, the output clock signal from the delay circuit 14 and the in-phase fb_clk are both delayed by 180 degrees. As a result, in the delay control unit 10, the delay operation is performed based on the phase difference between the rising edge of the second clock signal clk180 and the rising edge of the 180-degree-delayed feedback signal fb_clk, so that the synchronization between the input clock signal in_clk and the feedback signals fb_clk ends as soon as possible to generate the desired output signal DQS.

The situation when the phase difference between the feedback signal fb_clk and the input clock signal in_clk is greater than 180 degrees after the delay operation is described in detail. As shown in FIG. 5 (1), the input clock signal in_clk and the first clock signal clk000 change from the low level to the high level at time t11; in contrast, the feedback signal fb_clk is delayed by the existing delay time Tint and changed from the low level to the high level at time t12. Since the period from time t11 to time t12 indicates the phase difference less than a half period of the clock signal CK, the feedback signal fb_clk is delayed by more than 180 degrees relative to the period of the input clock signal in_clk. At this time, the clock control unit 17 selects the second clock signal clk180 as the input clock signal in_clk. Thus, the delay control unit 10 performs a delay operation on the second clock signal clk180, so that the rising edge of the second clock signal clk180 at time t13 and the rising edge of the feedback signal fb_clk delayed by 180 degrees at time t14 are at the same time point (namely, the second clock signal clk180 is synchronized with the feedback signal fb_clk). As a result, the delay amount due to the delayed operation that must be eliminated (that is, the locking time Tdll) becomes the period from time t14 to time t15.

In summary, as shown in FIG. 6 (1), in a conventional example, when the phase difference between the input clock signal and the output clock signal of the delay control unit 10 is greater than 180 degrees, since the locking time Tdll is prolonged, the overall time of the sequence is also prolonged. In contrast, in this embodiment, when the phase difference between the input clock signal and the output clock signal in the delay control unit 10 is greater than 180 degrees, since the DLL circuit 1 is configured, the second input clock signal clk180 can be configured as the input clock signal, so that the delay operation can be completed as soon as possible, and the time required for the entire sequence can be shortened.

In addition, FIG. 5 (2) shows the situation when the phase difference between the feedback signal fb_clk after the delay operation and the input clock signal in_clk is less than 180 degrees. In this case, since the phase difference is small, the first clock signal clk000 is selected. Thus, similar to the conventional example, the delay circuit 14 performs a delay operation on clk000 so that the rising edge of the first clock signal clk000 at time t21 coincides with the rising edge of the feedback signal fb_clk at time t22. As a result, both the existing delay time Tint is the period from time t21 to time t22, and the locking time Tdll is the period from time t22 to time t23. When the delay operation is performed in this way, the delay operation can be performed as early as in the conventional case as shown in FIG. 6 (2) in the case that the delay is less than 180 degrees, and the time required for the entire sequence can be shortened.

Returning to FIG. 3, the specific configuration of the clock control unit 17 for realizing such an operation will be described. The timing signal generating unit 171 includes: a plurality of flip-flop circuits 71~74 and an AND circuit 75. Four flip-flop circuits 71~74 are shown as examples, but the number is not limited. The number can be appropriately changed according to the length of the predetermined time required for the stability of the circuit.

A plurality of flip-flop circuits 71~74 are connected in series. The externally input reset signal dll_reset_n is input to the most upstream flip-flop circuit 71 as an input signal. The output signals of the adjacent upstream flip-flop circuits 71~73 are respectively configured as input signals to the other flip-flop circuits 72~74. After the first clock signal clk000 is inverted, the first clock signal clk000 is input as a clock signal to a plurality of flip-flop circuits 71~74. In addition, after the reset signal dll_reset_n is inverted, the reset signal dll_reset_n is input to the flip-flop circuits 71~74. The output signal of the flip-flop circuit 74 on the most downstream side is inverted and then input to the AND circuit 75. In addition, the output of the flip-flop circuit 73 adjacent to the upstream side of the flip-flop circuit 74 is input to the AND circuit 75, and the first clock signal clk000 is also input to the AND circuit 75. The AND circuit 75 performs AND operation on the input signals to output the timing signal sel_clk.

The operation of the timing signal generation unit 171 is described. When the input reset signal dll_reset_n changes from the low level to the high level, the change will be maintained for a predetermined period through a plurality of flip-flop circuits 71~74, and then input to the AND circuit 75 from the flip-flop circuit 74. Since the output signal of the flip-flop circuit 73, the output signal of the flip-flop circuit 74, and the first clock signal clk000 are input to the AND circuit 75, when the output from the flip-flop circuit 74 is at a high level, the AND circuit 75 generates and outputs the high-level (assert) timing signal sel_clk. In addition, the AND circuit 75 generates and outputs the low-level timing signal sel_clk. In this way, the timing signal sel_clk is only at the high level from the beginning of the delay operation until the predetermined time after the reset operation. That is, the timing signal sel_clk is generated as a one-shot signal.

The selection signal generating unit 172 is composed of a flip-flop circuit 76. The phase signal up/down is inverted and input to the flip-flop circuit 76 as an input signal, and the timing signal sel_clk is input to the flip-flop circuit 76 as a clock signal. In addition, the reset signal dll_reset_n is inverted and input to the flip-flop circuit 76. Then, the flip-flop circuit 76 outputs the selection signal sel180 as an output signal. As mentioned above, since the timing signal sel_clk is a one-shot signal that only changes from a low level to a high level when a predetermined period is passed after the start of the delay operation, the selection signal generating unit 172 may determine whether the delay is greater than 180 degrees after a predetermined period posterior to the delay operation.

The operation of the selection signal generating unit 172 will be described in the following paragraphs. In the selection signal generating unit 172, when the reset signal dll_reset_n is at a high level and the phase signal up/down is at a high level (up) at the rising edge of the timing signal sel_clk changing from a low level to a high level, the selection signal sel180 remains at the low level. In this case, since the phase difference between the input signals input to the delay control unit 10 is less than 180 degrees, a low-level selection signal sel180 indicating that the second clock signal clk180 is not selected is output. On the other hand, when, the reset signal dll_reset_n is at a high level and the phase signal up/down is at a low level (down) at the rising edge of the timing signal sel_clk changing from a low level to a high level, a high-level selection signal sel180 indicating that the second clock signal clk180 is selected is output.

The internal clock selection unit 173 is composed of a multiplexer 77. According to the selection signal sel180, the internal clock selection unit 173 selects either the first clock signal clk000 or the second clock signal clk180 as the input clock signal in_clk to output. That is, when the selection signal sel180 is at a high level, which indicates that the second selection signal clk180 is selected, the multiplexer 77 outputs the second clock signal clk180. In addition, the multiplexer 77 outputs the first clock signal clk000.

The clock control unit 17 can use a simple configuration to set either the first clock signal clk000 or the second clock signal clk180 as the input clock signal in_clk based on the phase signal up/down, and inputs the input clock signal in_clk to delay circuit 14. In this way, the DLL circuit 1 of the present embodiment can suppress the extension of the delay operation.

Next, the operations of the DLL circuit 1 of this embodiment including the clock control unit 17 will be described by using the flowcharts shown in FIG. 7 and FIG. 8.

Figure 7:
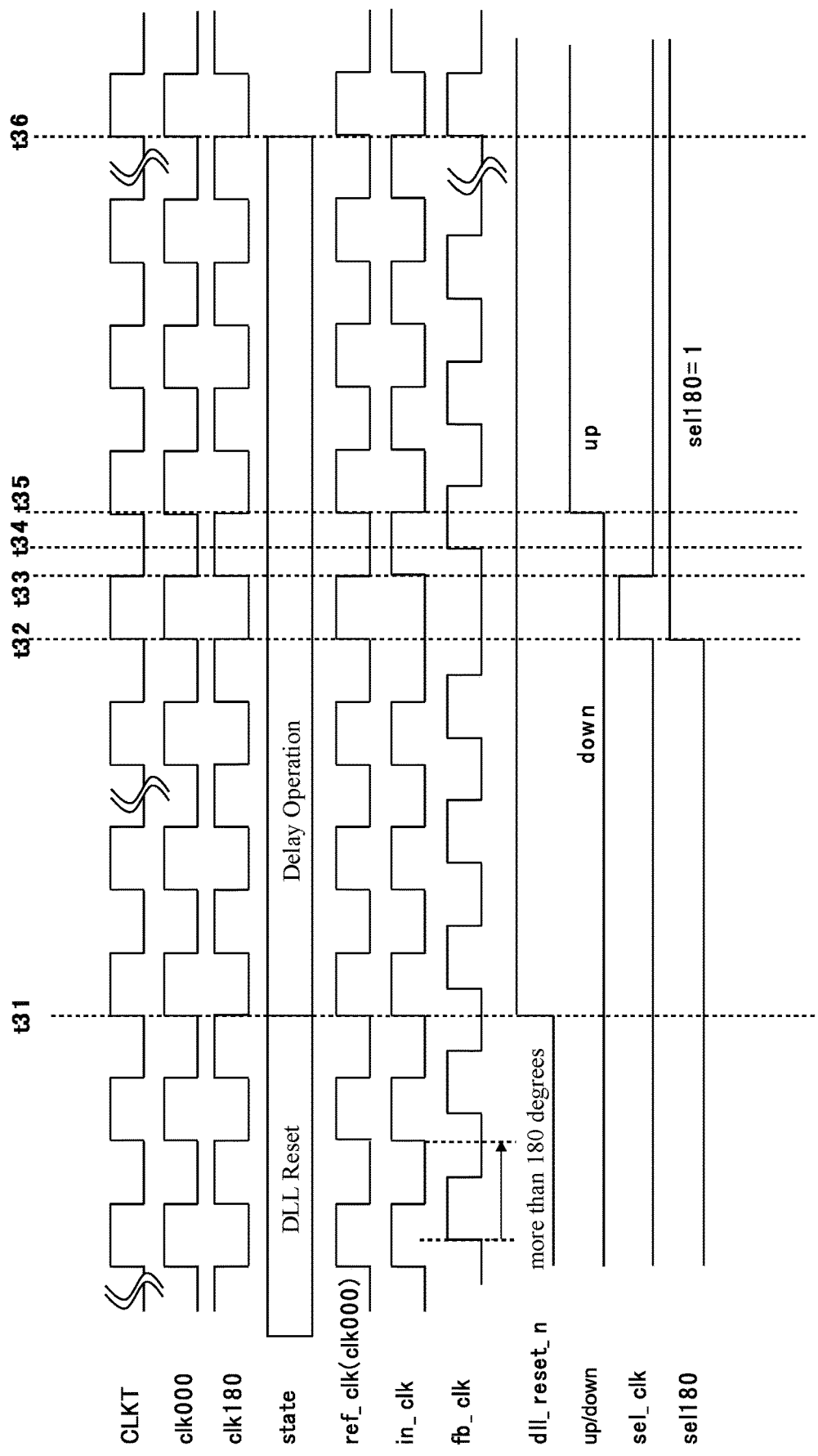
FIG. 7 is a timing diagram of the transition sequence of the signal voltage of each unit in the control circuit when the phase difference is greater than 180 degrees.

FIG. 7 illustrates the situation when the phase difference between the feedback signal fb_clk and the input clock signal in_clk is greater than 180 degrees. First, the sequence starts and the DLL reset state is entered. In the DLL reset state, the input clock signal in_clk is the first clock signal clk000, and the phase difference between the feedback signal fb_clk and the input clock signal in_clk is greater than 180 degrees. Afterwards, the DLL state ends at time t31, and the reset signal dll_reset_n changes from a low level to a high level. As for the state of the DLL circuit, the delay operation starts at the same time when the DLL reset state ends at time t31.

At time t32, in the timing signal generating unit 171, the timing signal sel_clk changes from a low level to a high level after a predetermined period. At time t32, the reset signal dll_reset_n is at a high level, and the phase signal up/down is at a low level (down). At the rising edge of the timing signal sel_clk, the high-level reset signal dll_reset_n and the low-level phase signal up/down are input to the selection signal generating unit 172, thereby the selection signal sel180 changing from a low level to a high level and then outputting. Thus, the input clock signal in_clk output from the clock control unit 17 becomes the second clock signal clk180, and from time t32 to time t33, the input signal in_clk and the second clock signal clk180 also maintain at the low level.

The input clock signal in_clk changes from a low level to a high level at time t33 based on the rising edge of the second clock signal clk180. In addition, by selecting the second clock signal clk180 as the input clock signal in_clk, the feedback signal fb_clk is also delayed by 180 degrees, maintains at the low level from time t32 to time t34, and changes from the low level to the high level at time t34. As the feedback signal fb_clk changes from the low level to the high level, the phase signal up/down changes from the low level to the high level at time t35. Namely, the phase difference between the feedback signal fb_clk and the input signal in_clk will become smaller (less than 180 degrees).

The delay circuit 14 delays the input clock signal in_clk as the second clock signal clk180 based on the phase signal up/down, determines the desired phase difference at time t36, and then ends the delay operation.

Figure 8:
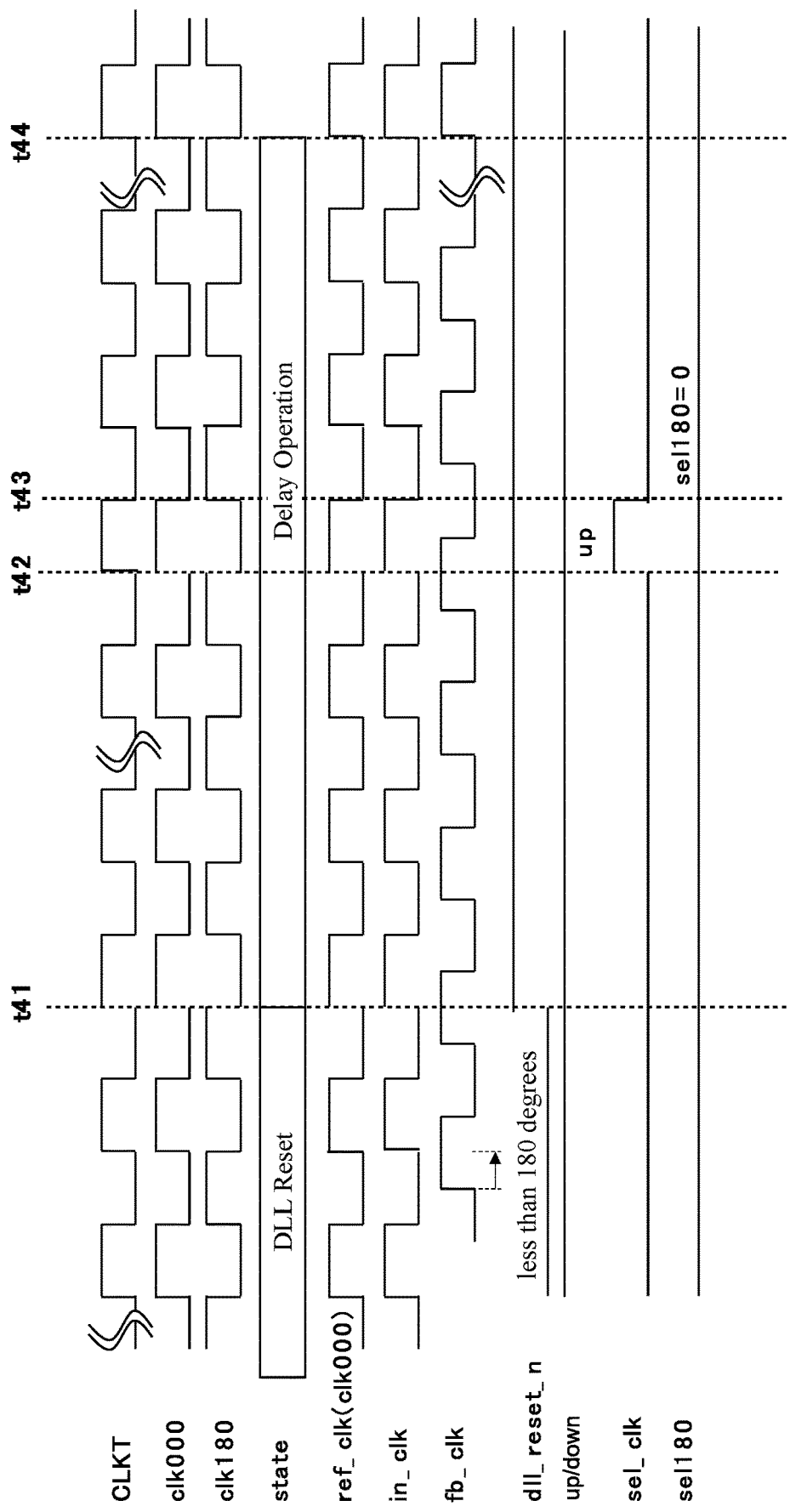
FIG. 8 is a timing diagram of the transition sequence of the signal voltage of each unit in the control circuit when the phase difference is less than 180 degrees.

Next, using the flowchart shown in FIG. 8, the operation of the DLL circuit 1 when the phase difference between the feedback signal fb_clk and the input clock signal in_clk is less than 180 degrees is described.

When the sequence starts, the state of the DLL circuit 1 is the DLL reset state. Afterwards, the reset operation ends at time t41, and the reset signal dll_reset_n changes from a low level to a high level. When the reset operation ends at time t41, the delay operation starts in the DLL circuit 1 at the same time.

Then at time t42, in the timing signal generating unit 171, the timing signal sel_clk changes from a low level to a high level. At the time t42, the reset signal dll_reset_n is at a high level, and the phase signal up/down is at an high level (up). At the rising edge of the timing signal sel_clk, the high-level reset signal dll_reset_n and the high-level phase signal up/down are input to the selection signal generating unit 172, thereby the selection signal maintaining at the low level. Therefore, the first clock signal clk000 is selected as the input clock signal in_clk, and the input signal in_clk also maintains at the high level as the first clock signal clk000 from the time t42 to the time t43. In addition, since the input signal in_clk is the first clock signal clk000, the feedback signal fb_clk will not be delayed by 180 degrees.

The delay circuit 14 delays the input clock signal in_clk as the first clock signal clk000 based on the phase signal up/down, determines the desired phase difference at time t44, and then ends the delay operation.

Figure 9:
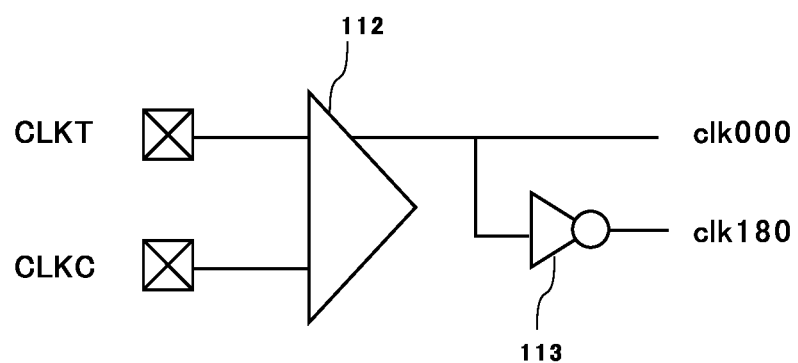
FIG. 9 is a schematic block diagram of a configuration of an input buffer in accordance with other configurations.

Modifications of the present invention will be described in the following paragraphs. The input buffer 11 is configured as shown in FIG. 9, and the input buffer 11 includes an amplifier 112 and an inverter 113. The clock signal CLKT and the clock signal CLKC having a complementary relationship are input to the amplifier 112 as external clock signals. The input clock signals CLKT and CLKC, which are complementary to each other, are amplified by the amplifier 112, and the amplifier 112 only outputs the first clock signal clk000 which is in phase with the clock signal CLKT. In addition, the first clock signal clk000 is input to the inverter 113 to invert the first clock signal clk000 to generate a second clock signal clk180. In the above-mentioned embodiment, since any signal is output from the amplifier 111, the first clock signal clk000 and the second clock signal clk180 have the same number of CMOS gate stages. In the embodiment shown in FIG. 9, the first clock signal clk000 and the second clock signal clk180 differ from each other in the number of CMOS gate stages by one stage of the inverter 113.

In the above embodiment, the control is changed based on whether the phase difference between the input signal in_clk and the delayed signal dll_clk (feedback signal fb_clk) is greater than 180 degrees, but the phase difference can also be set to a desired value. In addition, although the second clock signal clk180 is the input clock signal delayed by 180 degrees of the first clock signal clk000 in phase, the phase difference may also be set to a desired value. In addition, the semiconductor memory device may also be a SRAM (Static Random Access Memory), flash memory, or other semiconductor memory devices.

The embodiments and modifications described above are described to facilitate understanding of the present invention, and are not intended to limit the present invention. Therefore, each element disclosed in the above embodiments and modifications is meant to include all design changes and equivalents that fall within the technical scope of the present invention.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A control circuit, comprising:
a delay control unit, delaying an input clock signal to generate an output clock signal based on a phase difference of the input clock signal and the output clock signal;
wherein the control circuit further comprises a clock control unit;
wherein when the phase difference is greater than a first predetermined amount, the clock control unit delays the input clock signal by a second predetermined amount to be a clock signal, and inputs the clock signal to the delay control unit as the input clock signal;
wherein a first input clock signal and a second input clock signal are input to the clock control unit;
wherein the second input clock signal is generated by delaying the first input clock signal by the second predetermined amount;
wherein when the phase difference is greater than the first predetermined amount, the clock control unit selects the second input clock signal as the input clock signal;
wherein when the phase difference is not greater than the first predetermined amount, the clock control unit selects the first input clock signal as the input clock signal.

2. The control circuit as defined in claim 1,
wherein the clock control unit determines whether the phase difference is greater than the first predetermined amount at a predetermined time after a delay operation starts.

3. The control circuit as defined in claim 1,
wherein the delay control unit comprises a phase detection unit detecting the phase difference between the input clock signal and the output clock signal;
wherein the phase difference detected by the phase detection unit is input to the clock control unit.

4. The control circuit as defined in claim 1,
wherein the clock control unit comprises a selection signal generating unit and an internal clock selection unit, wherein a selection signal generated by the selection signal generating unit is input to the internal clock selection unit;
wherein the selection signal generating unit generates the selection signal, wherein the selection signal indicates whether the phase difference is greater than a predetermined value;

wherein the internal clock selection unit selects either the first input clock signal or the second clock signal based on the selection signal.

5. The control circuit as defined in claim 1, wherein
the delay control unit comprises a delay circuit and a DLL control unit;
wherein the delay circuit generates the output clock signal based on a delay amount set by the DLL control unit.

6. The control circuit as defined in claim 5, wherein
the delay control unit comprises a phase detection unit coupled to the DLL control unit;
wherein the phase detection unit receives a feedback signal and a reference clock signal to generate a phase signal, wherein the phase signal indicates that the feedback signal is leading or behind the reference clock signal.

7. The control circuit as defined in claim 6, wherein
the delay control unit comprises a replica unit coupled to the delay circuit and the phase detection unit;
wherein the replica unit receives the output clock signal generated by the delay circuit and outputs the output clock signal generated by the delay circuit as the feedback signal.

8. The control circuit as defined in claim 1, wherein
the first predetermined amount is 180 degrees, and the second predetermined amount is 180 degrees.

9. The control circuit as defined in claim 1, further comprising:
an input buffer, wherein an external clock signal is input to the input buffer;
wherein in the input buffer, the first input clock signal is generated from the external clock signal, and the external clock signal is inverted simultaneously to generate the second input clock signal.

10. The control circuit as defined in claim 1, further comprising:
an input buffer, wherein an external clock signal is input to the input buffer;
wherein in the input buffer, the first input clock signal is generated from the external clock signal, and the second input clock signal is simultaneously generated from a complementary clock signal of the external clock signal.

11. The control circuit as defined in claim 8,
wherein the delay operation is performed based on a phase difference between a rising edge of the second input clock signal and a rising edge of the output clock signal.

12. A semiconductor memory device, comprising:
a control circuit, wherein the control circuit comprises:
a delay control unit, delaying the input clock signal based on a phase difference between an input clock signal and an output clock signal to generate the output clock signal;
wherein the control circuit further comprises a clock control unit;
wherein when the phase difference is greater than a first predetermined amount, the clock control unit inputs a clock signal to the delay control unit as the input clock signal, wherein the clock signal is generated by delaying a phase of the input clock signal by a second predetermined amount;
wherein a first input clock signal and a second input clock signal are input to the clock control unit;
wherein the second input clock signal is generated by delaying the first input clock signal by the second predetermined amount;

wherein when the phase difference is greater than the first predetermined amount, the clock control unit selects the second input clock signal as the input clock signal;

wherein when the phase difference is not greater than the first predetermined amount, the clock control unit selects the first input clock signal as the input clock signal.

13. The semiconductor memory device as defined in claim 12,
wherein the semiconductor memory device is a DRAM.

14. The control circuit as defined in claim 1,
wherein the clock control unit further comprises a timing signal generating unit, a selection signal generating unit, and an internal clock selection unit;
wherein the clock control unit receives a reset signal and executes a delay operation when the reset signal changes from a first level to a second level;
wherein after the delay operation starts with passing a predetermined period, the timing signal generating unit generates a timing signal indicating the timing of the passing predetermined period based on the reset signal and the first input clock signal;
wherein the selection signal generating unit receives a phase signal indicating the phase difference, the reset signal, and the timing signal to generate a selection signal;
wherein when the phase signal is at the first level, it indicates that the phase difference between the first input clock signal and the output clock signal is greater than a predetermined value;
wherein when the selection signal generating unit receives the timing signal and the phase signal at the first level, the selection signal is changed from the first level to a second level and output, causing the internal clock selection unit to select the second input clock signal as the input clock signal.

15. The control circuit as defined in claim 14,
wherein the timing signal generating unit comprises a plurality of flip-flop circuits and an AND circuit;
wherein the plurality of flip-flop circuits are connected in series;
wherein the reset signal is input to the first one among the plurality of flip-flop circuits;
wherein the output signal of one of any two adjacent flip-flop circuits serves as the input signal of the other flip-flop circuit.

16. The control circuit of claim 15, wherein the first input clock signal being inverted is input as the clock signal to the plurality of flip-flop circuits;
wherein the reset signal being inverted is input to the plurality of flip-flop circuits;
wherein the output signal of a last one among the plurality of flip-flop circuits being inverted is input to the AND circuit, the output signal of the flip-flop circuit adjacent to the last one among the plurality of flip-flop circuits is input to the AND circuit, and the first input clock signal is input to the AND circuit.

17. The control circuit of claim 16, wherein when the reset signal changes from the first level to the second level, this change is maintained for a predetermined time through the plurality of flip-flop circuits and then input to the AND circuit from the last one among the plurality of flip-flop circuits.

18. The control circuit of claim 17, wherein the AND circuit receives the output signal of the flip-flop circuit adjacent to the last one among the plurality of flip-flop circuits, the output signal of the last one among the plurality of flip-flop circuits, and the first input clock signal;
wherein when the output signal of the last one among the plurality of flip-flop circuits is at a high level, the AND circuit outputs the timing signal at the high level, such that the timing signal remains at the high level from the beginning of the delay operation until a predetermined time after the reset operation.

19. The semiconductor memory device as defined in claim 12,
wherein the delay control unit comprises a phase detection unit detecting the phase difference between the input clock signal and the output clock signal;
wherein the phase difference detected by the phase detection unit is input to the clock control unit.

\* \* \* \* \*